United States Patent [19]

Todokoro et al.

[11] Patent Number: 4,520,469

[45] Date of Patent: May 28, 1985

[54] TRACKING SERVO SYSTEM FOR OPTICAL-DISC INFORMATION REPRODUCING APPARATUS

[75] Inventors: Shigeru Todokoro, Fujisawa; Hiroshi Nakane; Satoru Maeda, both of Yokohama, all of Japan

[73] Assignee: Tokyo Shibaura Denki Kabushiki Kaisha, Japan

[21] Appl. No.: 471,648

[22] Filed: Mar. 3, 1983

[30] Foreign Application Priority Data

Mar. 3, 1982 [JP] Japan .................................. 57-33327

[51] Int. Cl.³ .............................................. G11B 7/00
[52] U.S. Cl. ......................................... 369/44; 369/46
[58] Field of Search ..................... 358/342; 369/43–46, 369/109; 250/201–204

[56] References Cited

U.S. PATENT DOCUMENTS

| | | | |
|---|---|---|---|
| 3,962,721 | 6/1976 | de Haan | 369/46 X |
| 3,971,002 | 7/1976 | Bricot et al. | 369/46 X |
| 4,001,494 | 1/1977 | Adler et al. | 369/46 |
| 4,410,969 | 10/1983 | Maeda | 369/46 |

*Primary Examiner*—Robert L. Richardson
*Attorney, Agent, or Firm*—Finnegan, Henderson, Farabow, Garrett & Dunner

[57] ABSTRACT

A tracking servo system for an optical-disc information reproducing apparatus includes (a) a light source for generating a light beam to scan a target track on an optical-disc wherein the information is stored as a series of pits arranged in the form of the track; (b) four photodetectors, arranged in two pairs with each pair intersecting the other and being disposed in a direction oblique to an image of the track for converting an image of the pit into respective electric signals; (c) a circuit for comparing the phases of the electric signals and for producing a tracking error signal ranging in accordance with the phase difference between the electric signals; and (d) a motor and lens for deflecting the light beam along a path perpendicular to the target track in response to the tracking error signal, whereby the light beam accurately scans the target track.

8 Claims, 10 Drawing Figures

TRACKING SERVO SYSTEM FOR OPTICAL-DISC INFORMATION REPRODUCING APPARATUS

FIELD OF THE INVENTION

This invention relates to a tracking servo system and, more particularly, to a tracking servo system for an optical-disc information reproducing apparatus.

BACKGROUND OF THE INVENTION

In an optical-disc of the type presently used with a DAD (Digital Audio Disc) player or a video disc player, audio or video information is recorded in optically coded form as a series of recesses or pits which are formed in the information-carrying face of the optical-disc and arranged in either a spiral track or a plurality of concentric tracks about the center axis of the optical-disc. The audio or video information thus recorded is reproduced by optically scanning the individual recesses or pits along the spiral track or the concentric tracks by means of a beam of laser light which detects the lengths and spacings between the scanned pits. During playback, the optical-disc is usually rotated about the center axis thereof at a constant linear velocity or a constant angular velocity, and the beam of laser light is displaced radially relative the optical-disc by a tracking device or a pick-up unit which is a part of the DAD or video player. The laser beam is directed to a target track and is reflected by the information carrying face of the optical-disc or is passed through the optical-disc. The beam of light thus reflected or passed through the optical-disc is then converted into an electric signal by means of a photoelectric transducer unit mounted on the pick-up unit so as to facilitate further conversion into an audio or video signal.

In order to reproduce the information recorded on the optical-disc, it is necessary that the laser beam precisely track the target information track on the optical-disc. To this end, optical-disc information reproducing apparatus has heretofore employed a method wherein a light beam, exclusively used for tracking, is generated separately from the light beam used for reproducing the audio or video information signal, and a photodetector for detecting the tracking light beam is used to effect tracking control. This method has a disadvantage, however, in that the construction of such an apparatus is complicated. In cases where the use of a single light source is intended, the employment of a plurality of light sources being expensive, it is necessary to form three light beams for picking up the audio or video signal, focusing and tracking. This brings about a further disadvantage in that the power of such a single light source must be very high.

A method has also been employed wherein the audio or video information signal, the focusing signal and the tracking signal are all extracted with a single light beam. According to this method, the photoelectric transducer unit includes a plurality of photodetectors, for example, four photodetectors. An image of the pit formed by the aid of the single light beam is thus converted into the respective electric signals by the four photodetectors. The signals from the four detectors are then converted into three signals carrying audio or video information, focusing information and tracking information. The tracking information carrying signal is produced based on inconsistencies in the electric signals detected by the four photodetectors whenever the light beam wanders from the target track of the optical-disc.

This method is advantageous in that the apparatus is kept relatively simple and, since the three information signals are obtained with a single light beam, the light source may be of low power. However, the method does have a disadvantage when implemented in connection with optical-disc information reproducing apparatus. In such a case, the tracking information carrying signal must be independent from the other signals in order to accurately indicate the location of the target track. The tracking information carrying signal is, however, apt to be distorted by the audio or video signal due to, for example, lack of uniformity among the four photodetectors as to their transducing characteristics and/or their relative mechanical arrangement. The distortion of the tracking information carrying signal causes inaccurate operation of the tracking servo system for maintaining the light beam on the target track so that reproduction of the audio or video signal becomes impossible.

Figure 1:
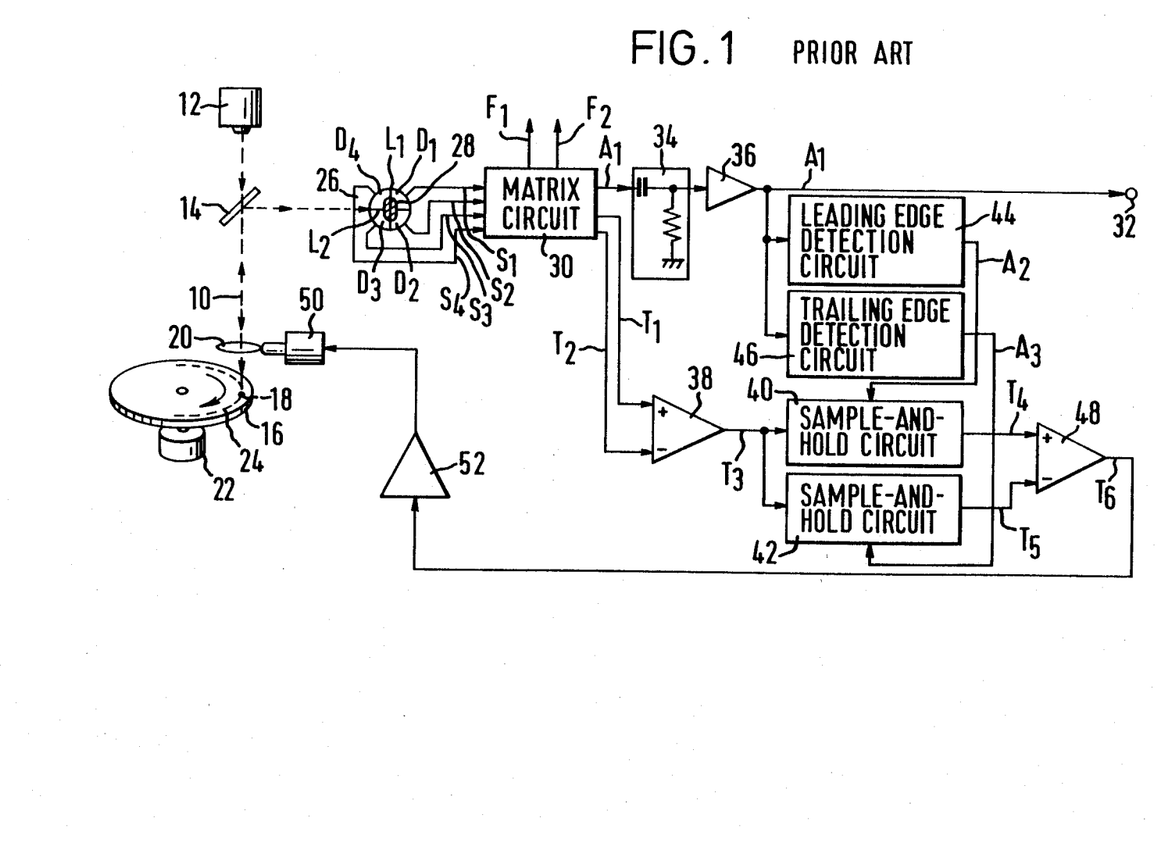
FIG. 1 is a schematic block diagram showing a circuit arrangement of a prior art optical-disc information reproducing apparatus.
Figure 2:
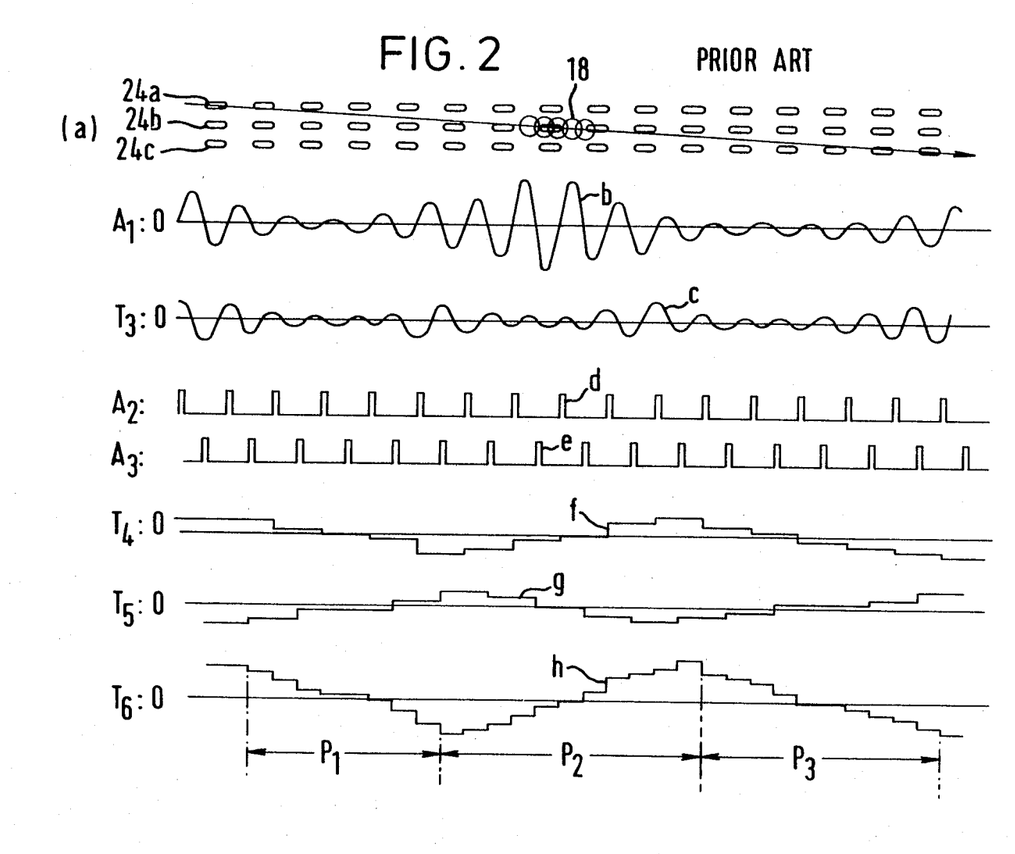
FIG. 2 is a graph showing various waveforms appearing in the circuit arrangement shown in FIG. 1 in accordance with movement of a light beam across three adjacent tracks.

Referring now to FIGS. 1 and 2, description will now be made of a typical prior art apparatus. FIG. 1 is a diagram for explaining the tracking servo system in a prior art optical-disc information reproducing apparatus. In the figure, parts which are not relevant to the control of the apparatus are omitted from the illustration. A single light beam 10 emerging from a laser light source (such as a He-Ne laser) 12 passes through a beam splitter 14. Beam 10 converges at a point on an optical-disc 16, termed the convergent spot 18, by means of an objective lens 20. Optical-disc 16 is rotated at a constant linear velocity by a motor 22. On optical-disc 16 are provided information tracks 24 bearing information relating to audio signals or video signals, etc., which have been recorded in coded form at high density, and which information is to be read at convergent spot 18.

At convergent spot 18 of light beam 10, the information of information track 24 is read in the form of changes in the reflection factor of the light due to a series of recesses or pits representing the coded information of the audio or video signal. The reflected light returns to objective lens 20 and is separated from the entrance beam by beam splitter 14. The reflected light is then guided to photodetector 26 such that light beam 10, having reached photodetector 26, becomes a detected spot bearing image 28 of the pit.

Photodetector 26 is divided into four individual photodetection portions corresponding to four regional elements D1, D2, D3 and D4 that are divided by boundary line L1 longitudinal to an image of the tracking direction and by boundary line L2 perpendicular to the image of the tracking direction. Pit image 28 is placed on or displaced from longitudinal line L1 according to light beam 10 tracing target track 24 accurately or inaccurately, respectively. Individual photodetection elements D1, D2, D3 and D4 output, respectively, electric signals S1, S2, S3 and S4 varying in accordance with the areas of elements D1, D2, D3 and D4 overlapped by pit image 28.

Signals S1, S2, S3 and S4 are matrixed by a matrix circuit 30 and then differently combined into five signals: audio or video information carrying signal A1, tracking information carrying signals T1 and T2, and focusing information signals F1 and F2. Signal A1 is formed by the addition of all of detection signal S1 to S4. Signal T1 is formed by the addition of detection signals S1 and S3 from elements D1 and D3, which are orthogonal to each other and thus form a combination obliquely disposed to the track image. Signal T2 is formed by the addition of detection signals S2 and S4 from elements D2 and D4 which are orthogonal to each other and form a combination intersecting the former combination and disposed obliquely to the track image. Signal F1 is formed by the addition of detection signals S1 and S2 from elements D1 and D2 which are adjacent each other across perpendicular boundary line L2. Signal F2 is formed by the addition of detection signals S3 and S4 from elements D3 and D4, which are also adjacent each other across perpendicular boundary line L2.

Focusing information carrying signals F1 and F2 are applied to a focusing control section (not shown). Audio or video information carrying signal A1 is applied to an output terminal 32 through a HPF (high pass filter) 34 and an amplifier 36, and is used for audio or video signal reproduction. Audio or video information carrying signal A1 appearing on output terminal 32 has a waveform b varying in accordance with light beam 10 moving across tracks 24a, 24b and 24c, as shown in FIG. 2. Respective tracking information carrying signals T1 and T2 are applied to a differential amplifier 38. Output signal T3 of differential amplifier 38 has a waveform c varying, as shown in FIG. 2, in accordance with the above-mentioned movement of light beam 10. Signal T3 is applied simultaneously to input terminals of sample-and-hold circuits 40 and 42.

Signal A1 on output terminal 32 is applied simultaneously to a leading edge detecting circuit 44 and a trailing edge detecting circuit 46. Output signals A2 and A3 from leading edge detecting circuit 44 and trailing edge detecting circuit 46, respectively, have waveforms d and e, as shown in FIG. 2. Impulses in waveform d appear when positive-going portions of waveform b increase over a reference level, usually a ground level. On the other hand, impulses in waveform e appear when negative-going portions of waveform b decrease below the reference level. Signals A2 and A3, thus comprising impulses representing the leading edges and trailing edges of signal A1, are applied to trigger terminals of sample-and-hold circuits 40 and 42, respectively. Accordingly, signal T3 (waveform c) is individually sampled according to the impulses of respective signals A2 and A3, and is held in the respective instant sampled levels so that signals T4 and T5 with waveforms f and g appear, respectively, on output terminals of sample and-hold circuits 40 and 42, as shown in FIG. 2. Signals T4 and T5 are applied to a differential amplifier 48. Output signal T6 from differential amplifier 48 has a waveform h and is used as a tracking error signal. Tracking error signal T6 is applied to a motor 50 through an amplifier 52 for controlling tracking movement of objective lens 20.

Tracking signal T6 becomes negative or positive, respectively, when light beam 10 deviates from target track 24b in either direction, i.e. upwardly or downwardly as shown in FIG. 2, and the absolute value of tracking signal T6 becomes maximum when light beam 10 is between adjacent tracks 24a and 24b or 24b and 24c. Accordingly, motor 50 is able to move objective lens 20 under the control of tracking error signal T6 so as to cause light beam 10 to approach target track 24b from either side of track 24b, as shown in FIG. 2.

The prior art apparatus described above, however, has several disadvantages. That is, signal T3 on the output terminal of differential amplifier 38 is obtained from electric signals S1 to S4 delivered by the four photodetection elements D1 to D4. Signal T3 is distorted in its level when an undesired phenomenon occurs; for example, a change or fluctuation of strength of light beam 10 influences signal T3. Furthermore, deformations and/or optical noise in the optical system or an unequality among the four photodetection elements D1 to D4 may also cause distortion of signal T3. Such distortion of signal T3 causes tracking error signal T6 to drive motor 50 erroneously. Further, there are relatively long periods of time, P1 and P3, during which signal T6 gradually decreases. Signal T6 during these periods P1 and P3 cannot be used for tracking control of light beam 10 on target track 24b. Only during period P2 in which signal T6 gradually increases is signal T6 able to be used for tracking control of light beam 10 towards target track 24b. Thus the period during which tracking control of light beam 10 to target track 24b is effective is short and restricted. Additionally, because circuits 40, 42, 44 and 46 for edge detections and sample-and-hold operations must exhibit high speed response characteristics, the apparatus becomes complicated in construction and thus expensive.

SUMMARY OF THE INVENTION

It is, therefore, an object of the present invention to provide an optical-disc information reproducing apparatus for reliably performing tracking control of a light beam along a target track.

Another object of the present invention is to provide an optical-disc information reproducing apparatus in which the effective period of a tracking error signal is long.

A further object of the present invention is to provide an optical-disc information reproducing apparatus which is simple in construction and low in cost.

According to the present invention, a tracking servo system for an optical-disc information reproducing apparatus in which information stored in an optical-disc as a series of recesses or pits arranged in parallel concentric tracks or a single spiral track is scanned by a light beam, comprises a light source for generating the light beam used for scanning a target track of the parallel extending tracks or the single spiral track; first and second photodetecting means, intersecting each other and disposed obliquely relative a first image of the target track, for converting a second image of the pit or recess into first and second electric signals, respectively, the first and second images being formed by reflection of the light beam from the optical-disc; means for comparing the phases of the first and second electric signals and for producing a tracking error signal varying in accordance with a difference between the phases of said electric signals; and means for deflecting said light beam in a path perpendicular to the target track in response to the tracking error signal, thereby causing the light beam to scan the target track accurately.

Additional objects and advantages of the present invention will be apparent to persons skilled in the art from a study of the following description and the accompanying drawings.

DESCRIPTION OF THE PREFERRED EMBODIMENTS

The present invention will now be described in detail with reference to the FIG. 3 to FIG. 10. Throughout the drawings, including FIGS. 1 and 2, like reference numerals or letters will be used to designate like or equivalent elements.

Figure 3:
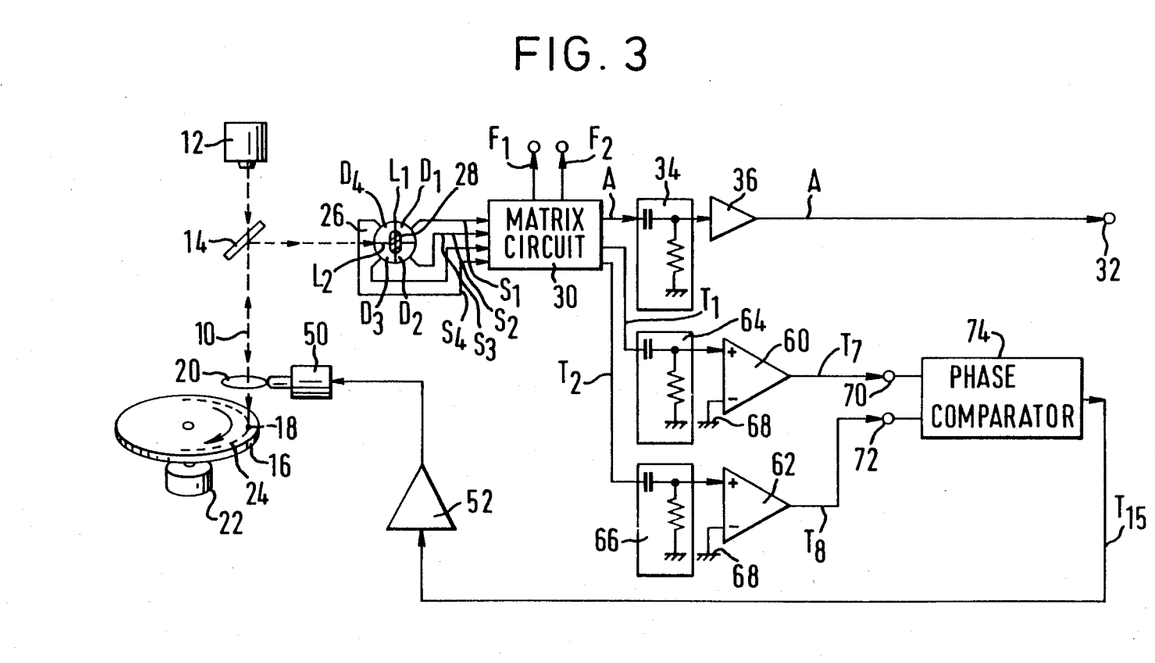
FIG. 3 is a schematic block diagram showing a circuit arrangement of a preferred embodiment of an optical-disc information reproducing apparatus according to the present invention.

FIG. 3 is a block diagram of a fundamental circuit arrangement of an optical-disc information reproducing apparatus embodying the present invention. As in the case of the circuit illustrated in FIG. 1, a single light beam 10 emerging from laser light source 12 passes through beam splitter 14. Beam 10 is converged on a point on optical-disc 16 defining a convergent spot 18 by means of objecting lens 20. Optical-disc 16 is rotated at a constant linear velocity by motor 22. On optical-disc 16, information tracks 24 bearing information relating to audio signals or video signals, etc., are recorded in coded form at high density, which information is to be read at convergent spot 18.

At convergent spot 18 of light beam 10, information from the information track 24 is read in the form of changes in the reflection factor of the light due to a series of recesses or pits representing the coded information of the audio or video signal. The reflected light is returned to objective lens 20, separated from the entrance beam by beam splitter 14, and guided to photodetector 26. Light beam 10, having reached photodetector 26, becomes a detected spot bearing image 28 of the pit.

Photodetector 26 is quartered into individual photodetection portions indicated as regional elements D1, D2, D3 and D4, which are divided by boundary line L1 longitudinal to an image of the tracking direction and by boundary line L2 perpendicular to the image of the tracking direction. Pit image 28 is placed on or displaced from longitudinal line L1, accordingly, as light beam 10 traces target track 24 accurately or inaccurately. Individual photodetection elements D1, D2, D3 and D4, respectively, output electric signals S1, S2, S3 and S4 varying in accordance with the respective areas of individual elements D1, D2, D3 and D4 that are overlapped by pit image 28.

Signals S1, S2, S3 and S4 are matrixed by matrix circuit 30 and then combined in various manners into five signals: audio or video information carrying signal A, tracking information carrying signals T1 and T2 and focusing information carrying signals F1 and F2. Signal A is formed by the addition of all of detection signals S1 to S4. Signal T1 is formed by the addition of detection signals S1 and S3 from elements D1 and D3, which are orthogonal to each other and thus form a combination obliquely disposed to the track image. Signal T2 is formed by the addition of detection signals S2 and S4 from elements D2 and D4, which are orthogonal to each other and thus form another combination intersecting the former combination and disposed obliquely to the track image. Signal F1 is formed by the addition of detection signals S1 and S2 from elements D1 and D2, which are adjacent to each other across perpendicular boundary line L2. Signal F2 is formed by the addition of detection signals S3 and S4 from elements D3 and D4, which are also adjacent to each other across perpendicular boundary line L2.

Figure 5:
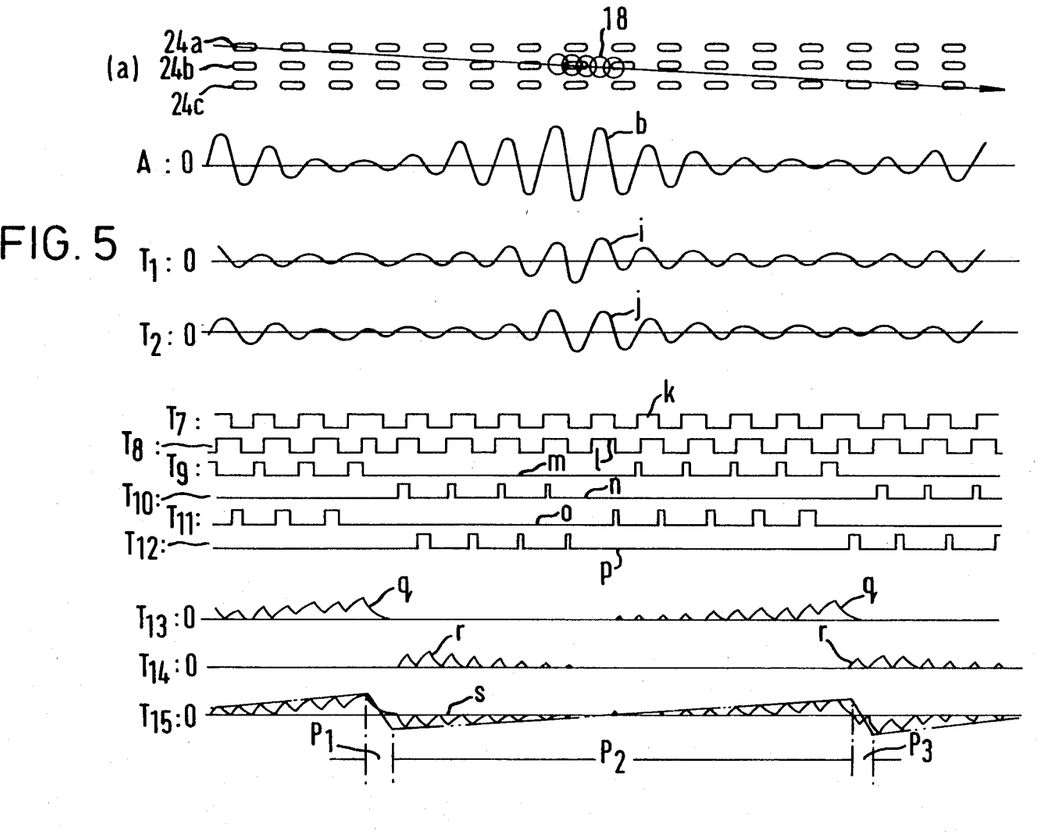
FIG. 5 is a graph showing various waveforms appearing in the circuit arrangement shown in FIG. 3 in accordance with movement of a light beam across three adjacent tracks.

Focusing information carrying signals F1 and F2 are applied to a focusing control section (not shown). Audio or video information carrying signal A is applied to output terminal 32 through HPF 34 and amplifier 36, and is used for audio or video signal reproduction. Audio or video information carrying signal A appearing on output terminal 32 has waveform b varying in accordance with light beam 10 moving across tracks 24a, 24b and 24c in the order as shown in FIG. 5. Up to this point, therefore, the parts of FIG. 3 described hereinabove are the same as that of the prior art apparatus shown in FIG. 1.

Tracking information carrying signals T1 and T2 are applied, respectively, to pulse shaping circuits 60 and 62 through HPFs 64 and 66. Pulse shaping circuits 60 and 62 are formed by differential amplifiers in which the non-inverted input terminals are connected to matrix circuit 30 for receiving tracking information signals T1 and T2, respectively, and the inverted input terminals are connected to a reference potential source 68. As illustratively shown in FIG. 3, source 68 may be at ground or zero potential, although other sources may be used as will be described hereinbelow without departing from the spirit or scope of the present invention. Tracking information carrying signals T1 and T2, having respective waveforms i and j varying, as shown in FIG. 5, in accordance with the movement of light beam 10 across information tracks 24a to 24c, are converted by pulse shaping circuits 60 and 62 into pulse shaped signals T7 and T8 having waveforms k and l, respectively. Signals T7 and T8, appearing on output terminals of pulse shaping circuit 60 and 62, respectively, are applied to input terminals 70 and 72 of a phase comparator 74.

Figure 4:
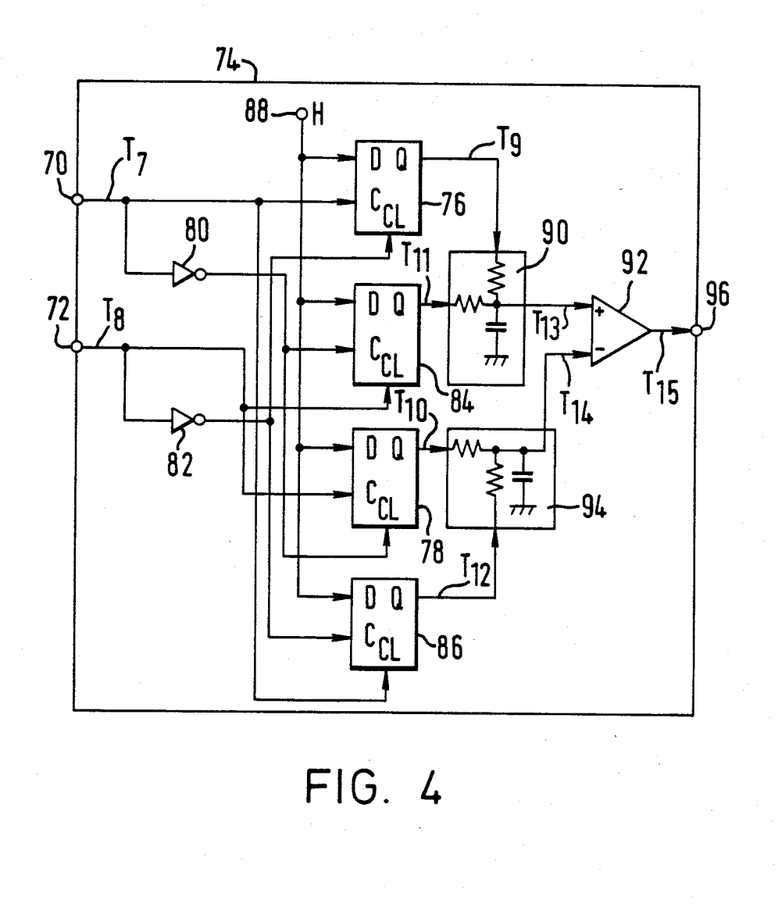
FIG. 4 is a block diagram showing in detail the phase comparator of the circuit arrangement of FIG. 3.

Phase comparator 74 is constructed as shown in detail in FIG. 4. Signals T7 and T8 on respective input terminals 70 and 72 are directly applied to clock terminals C of first and second delayed flip-flops (referred to hereinbelow as "d-FF") 76 and 78. Signals T7 and T8 are also applied to clear terminals CL of second and first d-FFs 78 and 76, respectively, through first and second inverters 80 and 82, respectively. Further, signals T7 and T8, inverted through first and second inverters 80 and 82, are branched and applied to clock terminals C of third and fourth d-FFs 84 and 86. Signals T7 and T8 on input terminals 70 and 72 are also branched and applied to clear terminals CL of fourth and third d-FFs 86 and 84. The D-terminals of first to fourth d-FFs 76, 78, 84 and 86 are all connected to a high potential source 88 having a level designated high or "H". In d-FFs 76, 78, 84 and 86, each potential on the respective Q-terminal is set to the H level when a potential on clock terminal C changes to the H level while a potential on clear terminal CL is maintained at the H level. In a known fashion, each potential on the Q-terminals is reset to a low or "L" level when the potential on the corresponding clear terminal CL also changes to the L level. Therefore, signals T9, T10, T11 and T12 appearing on respective Q-terminals of first to fourth d-FFs 76, 78, 84 and 86, and having waveforms m, n, o and p, respectively, vary as shown in FIG. 5 in accordance with the relationship between signals T7 and T8.

Waveform m of signal T9 on the Q-terminal of first d-FF 76 has pulses each beginning at the leading edge of certain pulses in waveform k of signal T7 and ending at the leading edge of corresponding pulses in waveform l of signal T8. That is, each pulse in waveform m of signal T9 represents a phase difference between the leading edges of corresponding pulses in waveforms k and l of signals T7 and T8 when the leading edge of the pulse in waveform k of signal T7 precedes the leading edge of the corresponding pulse in waveform l of signal T8.

Waveform n of signal T10 on the Q-terminal of second d-FF 78 has pulses beginning at the leading edge of a pulse in waveform l of signal T8 and ending at the leading edge of corresponding pulse in waveform k of signal T7. That is, each pulse in waveform n of signal T10 represents a phase difference between the leading edges of corresponding pulses in waveforms l and k of signals T8 and T7 when the leading edge of the pulse in waveform k lags behind that of the corresponding pulse in waveform l.

Waveform o of signal T11 on the Q-terminal of third d-FF 84 has pulses beginning at the trailing edge of a pulse in waveform k of signal T7 and ending at the trailing edge of a corresponding pulse in waveform l of signal T8. That is, each pulse in waveform o of signal T11 represents a phase difference between the trailing edges of corresponding pulses in waveforms k and l of signals T7 and T8 when the trailing edge of the pulse in waveform k of signal T7 precedes that of the corresponding pulse in waveform l of signal T8.

Waveform p of signal T12 on the Q-terminal of fourth d-FF 86 has pulses each beginning at the trailing edge of a pulse in waveform l of signal T8 and ending at a trailing edge of a corresponding pulse in waveform k of signal T7. That is, each pulse in waveform p of signal T12 represents a phase difference between the trailing edges of the corresponding pulses in waveforms l and k of signals T8 and T7 when the trailing edge of the pulse in waveform k of signal T7 lags behind that of the corresponding pulse in waveform l of signal T8.

Signals T9 and T11 are combined by a first differentiator 90, and then applied to a non-inverted input terminal of a differential amplifier 92. Signals T10 and T12 are combined by a second differentiator 94 and then applied to an inverted input terminal of differential amplifier 92. Signal T13 appearing on the non-inverted input terminal of differential amplifier 92 has a waveform q varying, as shown in FIG. 5, in accordance with the movement of light beam 10 across information tracks 24a to 24c. Similarly, signal T14 appearing on the inverted input terminal of differential amplifier 92 has a waveform r varying as shown in FIG. 5, in accordance with the movement of light beam 10 across information tracks 24a to 24c. As the result of the subtraction between signals T13 and T14 by differential amplifier 92, output signal T15 from differential amplifier 92 has a waveform s varying, as shown in FIG. 5, in accordance with the movement of light beam 10 across information tracks 24a to 24c. Signal T15 on output terminal 96 of phase comparator 74 is applied to motor 50 through amplifier 52 and is used for tracking error signal. Tracking error signal T15 drives motor 50 for controlling objecting lens 20 so as to cause light beam 10 to trace precisely, for example, target track 24b.

In the above-described embodiment of the present invention, the amplitude components of tracking information carrying signals T1 and T2 from matrix circuit 30 are eliminated by pulse shaping circuits 60 and 62 which produce waveforms of pulses of a standard amplitude. Therefore, signals T7 to 15 are isolated from any distortion caused by various undesired phenomena such as described in connection with the above explanation of the prior art apparatus. Further, as easily understood from FIG. 5, waveform s of signal T15 has a long period P2 during which the waveform gradually increases in accordance with the movement of light beam 10 across information tracks 24a to 24c, and during which the tracking operation of light beam 10 to target track 24b can be effectively performed. On the other hand, waveform s of signal T15 has very short periods P1 and P3 during which the waveform suddenly decreases as light beam 10 moves across information tracks 24a to 24b, and during which the tracking operation of light beam 10 to target track 24b cannot be performed. This means that the effective range (P2) of the tracking operation of light beam 10 is greatly expanded compared to the ineffective ranges (P1 and P3) so that the tracking operation of light beam 10 can be precisely and quickly performed according to the present invention.

Referring now to FIGS. 6 to 10, the operation of phase comparator 74 during various states is described in detail. In those drawings, waveform s of tracking error signal T15 is modified to a pulse shaped signal for simplification of explanation.

Figure 6:
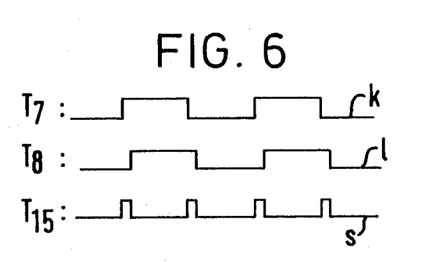
FIGS. 6 to 10 are graphs showing various waveforms for explaining tracking operations of the circuit arrangement shown in FIG. 3 in various states of photodetection signals.

FIG. 6 shows a state in which waveform k of signal T7 is the same as that of signal T8 but follows that of signal T8. In this state, corresponding to displacement of spot 18 from the target track, pulses indicating the phase difference between signals T7 and T8 appear twice for every one pulse in waveform k or l. This means that the response characteristics of tracking operation are raised higher and the sensitivity for displacing of light beam 10 from target track 24b is also improved.

Figure 7:
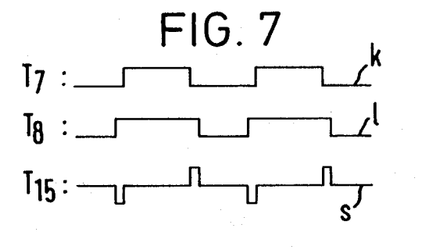

FIG. 7 shows a state in which signals T7 and T8 are in phase, but the respective duties of pulses in both waveforms are different in that waveform l has a higher duty cycle than waveform k. In this state, a negative pulse and a positive pulse appear for every one pulse in waveform k or l. The negative and positive pulses cancel each other so that tracking error signal T15 is prevented from mistakenly driving motor 50.

Figure 8:
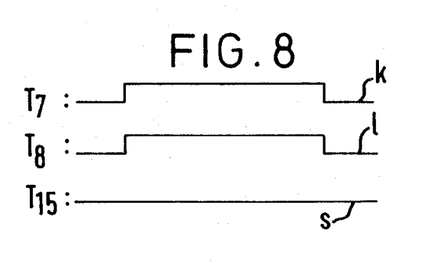

FIG. 8 shows a state in which the waveforms of signals T7 and T8 are identical but elongated due to, for example, a decrease in the rotation speed of optical-disc 16. In this state, signal T15 is maintained at zero level in spite of such a change in the rate of signals T7 and T8.

Figure 9:
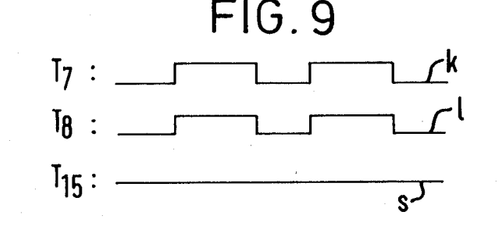

FIG. 9 shows a state in which the duty cycles of both signals T7 and T8 simultaneously fluctuate in response, for example, to changes in the rotation speed of optical-disc 16. In this state, signal T15 is also maintained at zero level without being influenced by the simultaneous fluctuations of signals T7 and T8.

Figure 10:
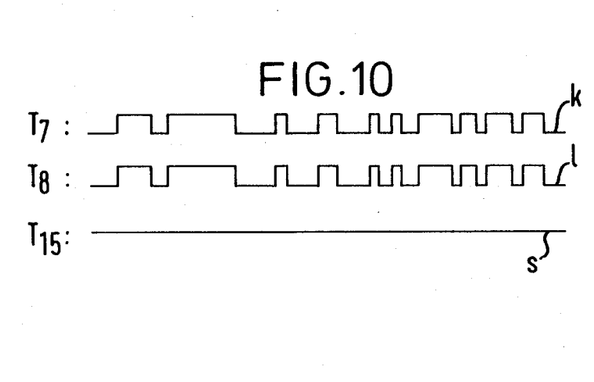

Lastly, FIG. 10 shows a state in which the coded information signal represented by the series of pits is a signal modulated by an EFM (Eight-to-Fourteen Modulation) process so that both waveforms k and l have random components in frequency. In this state, signal T15 is also maintained at a zero level in spite of the random frequency components in signals T7 and T8.

Therefore, as described hereinabove in relation to FIGS. 6 to 10, high reliability in tracking error signal T15 can be accomplished by the present invention throughout various operating conditions of the optical-disc information reproducing apparatus.

Inasmuch as the present invention is subject to many variations, modifications and changes in detail, it is intended that all matter contained in the foregoing description or shown in the accompanying drawings be interpreted as illustrative and not in a limiting sense. Accordingly, it should be evident to those skilled in the art that minor variations may be made in the disclosed embodiments without departing from the spirit and scope of the invention.

What is claimed is:

1. A tracking servo system for an optical-disc information reproducing apparatus in which information stored in an optical disc as a series of recesses arranged in predetermined tracks is scanned by a light beam defining a convergent spot on the optical-disc, said system comprising:

a light source for generating the light beam used for scanning a target track of the predetermined tracks of the optical-disc;

first and second photodetecting means for converting an image corresponding to said convergent spot on said target track into first and second electric signals, respectively, said image being formed by reflection of the light beam from the optical-disc;

means for comparing the phases of said first and second electric signals and for producing a tracking error signal varying in accordance with a difference between the phases of said electric signals; and means for deflecting said light beam in response to said tracking error signal so as to move said convergent spot in a path on the optical-disc perpendicular to said target track, thereby causing the light beam to scan said target track accurately.

2. A tracking servo system according to claim 1, said phase comparing means including:

pulse shaping means for shaping said first and second electric signals into first and second pulse shaped signals, respectively; and means for detecting phase differences between the leading edges and between the trailing edges of corresponding first and second pulse shaped signals.

3. A tracking servo system according to claim 2, said phase comparing means further including:

means connected to said phase differences detecting means for generating said tracking error signal, said tracking error signal changing from a first polarity to a second polarity in response to the detected phase differences.

4. A tracking servo system according to claim 3, wherein said deflecting means deflects said light beam in a first direction along said path and in a second direction along said path in response to said tracking error signal being of said first polarity and said second polarity, respectively.

5. A tracking servo system according to claim 4, wherein said phase differences detecting means includes a pair of phase detection sections, one of said sections detecting a phase difference between the leading edges of corresponding first and second pulse shaped signals and the other of said sections detecting a phase difference between the trailing edges of corresponding first and second pulse shaped signals.

6. A tracking servo system according to claim 5, wherein said phase detection sections are each provided with a pair of phase detectors, one of said phase detectors performing said phase difference detection when the leading edge or the trailing edge of one of the first pulse shaped signals precedes, respectively, the leading edge or the trailing edge of the corresponding one of the second pulse shaped signals, and the other of said phase detectors performing said detection when the leading edge or the trailing edge of one of the first pulse shaped signals lags behind, respectively, the leading edge or the trailing edge of the corresponding one of said second pulse shaped signals.

7. A tracking servo system according to claim 6, wherein each of said phase detectors is a delayed flip-flop having a clock input terminal and a clear input terminal connected to a respective one of said first and second photodetecting means.

8. A tracking servo system according to claim 1, wherein said first and second photodetecting means are each provided with a pair of photodetection elements for converting parts of said image overlapping thereon into corresponding parts of said first and second electric signals, said photodetection elements being arranged in a square with the photodetection elements of said first photodetecting means provided on one diagonal of the square and the photodetection elements of said second photodetecting means provided on the other diagonal of the square.

* * * * *